(12) United States Patent
Easton et al.

(10) Patent No.: US 12,035,064 B2
(45) Date of Patent: Jul. 9, 2024

(54) PWM SYNCHRONISATION

(71) Applicant: CAMBRIDGE MECHATRONICS LIMITED, Cambridge (GB)

(72) Inventors: Mark Easton, Cambridge (GB); Paul Windle, Cambridge (GB); Ian Edward Charles Rogers, Cambridge (GB); Andrew Benjamin Simpson Brown, Cambridge (GB); Christopher Richard Avery, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 353 days.

(21) Appl. No.: 17/425,584

(22) PCT Filed: Jan. 27, 2020

(86) PCT No.: PCT/GB2020/050174
§ 371 (c)(1),
(2) Date: Jul. 23, 2021

(87) PCT Pub. No.: WO2020/152481
PCT Pub. Date: Jul. 30, 2020

(65) Prior Publication Data
US 2022/0141357 A1  May 5, 2022

(30) Foreign Application Priority Data

Jan. 25, 2019 (GB) .................................. 1901074
Mar. 18, 2019 (GB) .................................. 1903677

(51) Int. Cl.
*H04N 5/04* (2006.01)
*H04N 23/54* (2023.01)
*H05B 47/16* (2020.01)

(52) U.S. Cl.
CPC ............... *H04N 5/04* (2013.01); *H04N 23/54* (2023.01); *H05B 47/16* (2020.01)

(58) Field of Classification Search
CPC .......... H04N 5/04; H04N 23/54; H04N 23/52; H04N 25/745; H05B 47/16; G02B 7/08; Y02B 20/40; F03G 7/065
See application file for complete search history.

(56) References Cited

U.S. PATENT DOCUMENTS 9,518,566 B2 * 12/2016 Eddington ........... G02B 27/646
2009/0195679 A1    8/2009 Matsumoto
(Continued)

FOREIGN PATENT DOCUMENTS

EP          0679918         11/1995
JP        2017076900          4/2017
(Continued)

OTHER PUBLICATIONS

Anonymous: "Duty cycle—Wikipedia", https://en.wikipedia.org/w/index.php?title=Duty_cycle&oldid=870723291 (3 pages).
(Continued)

*Primary Examiner* — Luong T Nguyen
(74) *Attorney, Agent, or Firm* — Haley Guiliano LLP (57) ABSTRACT

Disclosed is a method of synchronising an image sensor with a PWM driver operable to drive an arrangement associated with the image sensor, wherein at least one synchronisation signal produced by the image sensor is used to reset the PWM driver and the at least one synchronisation signal is delayed before being used to reset the PWM driver such that the switching on or off of the at least one synchronisation signal occurs at a defined time in relation to a sensitive period of the image sensor's operation.

20 Claims, 6 Drawing Sheets

(56) References Cited

U.S. PATENT DOCUMENTS

| | | | | |
|---|---|---|---|---|
| 2011/0249131 A1* | 10/2011 | Topliss | ................... | G03B 5/00 |
| | | | | 348/208.7 |
| 2012/0086824 A1* | 4/2012 | Asakura | ............ | H04N 23/6812 |
| | | | | 348/208.99 |
| 2018/0171991 A1* | 6/2018 | Miller | ................. | G02B 27/646 |
| 2020/0387049 A1* | 12/2020 | Kimura | ............... | H02K 11/225 |

FOREIGN PATENT DOCUMENTS

| | | |
|---|---|---|
| KR | 2015 0057786 | 5/2015 |
| WO | 80/00291 A1 | 2/1980 |
| WO | WO 8000291 | 2/1980 |
| WO | WO 2016196636 | 12/2016 |

OTHER PUBLICATIONS

GB Search Report dated Jul. 17, 2019 of GB Application 1901074.3.
GB Search Report dated Sep. 4, 2019 of GB Application 1903677.1.
International Search Report and Written Opinion of PCT/GB2020/050174 dated Mar. 10, 2020.

* cited by examiner

Fig. 1

--Prior Art--

PWM SYNCHRONISATION

CROSS-REFERENCE TO RELATED APPLICATIONS

This application is a national stage application under 35 U.S.C. § 371 of International Application PCT/GB2020/050174, filed Jan. 27, 2020, which claims priority of GB Patent Applications 1901074.3, filed Jan. 25, 2019, and 1903677.1, filed Mar. 18, 2019. The disclosure of which are hereby incorporated by reference herein in their entireties.

The present application generally relates to delivering power to a shape memory alloy (SMA) actuator. In particular, it relates to delivering power in a controlled manner in a system employing an SMA actuator which also comprises an image sensor.

Systems comprising an image sensor tend to be particularly susceptible to problems associated with Electromagnetic Interference (EMI). In this regard, images produced from image sensors exposed to EMI can experience issues, which can include noise on the generated image. The noise may take the form of one or more lines visible in the image. In certain modes, the line or lines can appear to move across the image in a manner which is distracting to the user and which can greatly degrade the image and the user experience.

The problem can be particularly pronounced in battery-operated devices, which tend to operate with a restricted power budget. This results in widespread use of Pulse Width Modulation (PWM) techniques which can improve efficiencies, but which can lead to increased EMI.

A particular, but not limiting, example of a device employing both PWM techniques and an image sensor is a mobile telephone, equipped with a camera, whereby image stabilisation and/or focussing is accomplished by means of a Shape Metal Alloy actuator.

Figure 1:
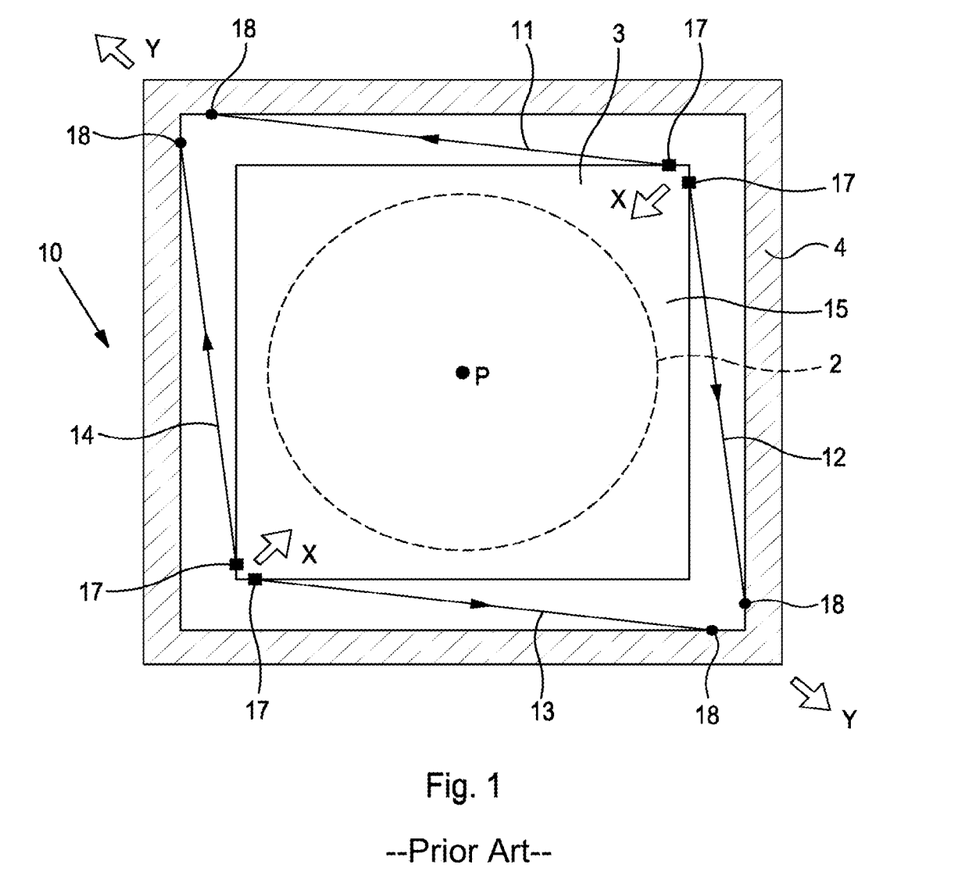
FIG. 1 shows a typical SMA actuator arrangement known in the art.

Such a system is shown in FIG. 1, which 1 shows a plan view of an arrangement of shape memory alloy (SMA) actuator wires in an actuator 10. The actuator 10 may be incorporated into any apparatus comprising at least one component that requires moving during operation. For example, the actuator 10 may be used to move an optical element of an image capture device, but this is a non-limiting example. The actuator 10 may be incorporated into, for example, a smartphone, a mobile computing device, a laptop, a tablet computing device, a security system, a gaming system, an augmented reality system, an augmented reality device, a wearable device, a medical device, a drug delivery device, a drone (aerial, water, underwater, etc.), a vehicle (e.g. a car, an aircraft, a spacecraft, a submersible vessel, etc.), and an autonomous vehicle. It will be understood this is a non-exhaustive list of example devices into which the present actuator may be incorporated. In some cases, miniaturisation may be an important design criterion for the actuator.

The actuator 10 may, in use, comprise a component 2 that requires moving. The component 2 may be supported on a support structure 4 by a suspension system, in a manner allowing movement of the component 2 relative to the support structure 4 in two orthogonal directions each perpendicular to the primary axis P. In operation, the component 2 may be moved orthogonally to the primary axis P in two orthogonal directions, shown as X and Y.

The actuator 10 may, in embodiments, comprise four shape memory alloy (SMA) actuator wires 11 to 14 that are each connected to support structure 4 and to a movable platform 15 that is used move the component 2 that requires moving. (It will be understood that this is just one example arrangement of an SMA actuator—the present techniques apply to an actuator having at least two SMA actuator wires). Each of the SMA actuator wires 11 to 14 is held in tension, thereby applying a force between the movable platform 15 and the support block 16 in a direction perpendicular to the primary axis P. In operation, the SMA actuator wires 11 to 14 move component 2 relative to the support block 16 in two orthogonal directions perpendicular to the primary axis P. The SMA actuator wires 11 to 14 each extend perpendicular to the primary axis P. In this actuator 10, the SMA actuator wires 11 to 14 may extend in a common plane, which may be advantageous in minimising the size of the actuator 10 along the primary axis P (e.g. the overall height or depth of the actuator 10).

Irrespective of whether the SMA actuator wires 11 to 14 are perpendicular to the primary axis P or inclined at a small angle to the plane perpendicular to the primary axis P, the actuator 10 may be made very compact, particularly in the direction along the primary axis P. The SMA actuator wires 11 to 14 may be, in some embodiments, very thin, typically of the order of 25 μm in diameter, to ensure rapid heating and cooling. The arrangement of SMA actuator wires 11 to 14 may not add to the footprint of the actuator 10 and may be made very thin in the direction along the primary axis P, since the SMA actuator wires 11 to 14 are laid essentially in a plane perpendicular to the primary axis P in which they remain in operation. The height along the primary axis may then depend on the thickness of the other components such as crimping members 17 and 18, and on the height necessary to allow manufacture. In practice, it has been found that the actuator arrangement of SMA actuator wires 11 to 14 may be manufactured to a height of less than 1 mm. In the example of a smartphone camera, the size of the SMA actuator wires 11 to 14 typically restricts the angle between the SMA actuator wires 11 to 14 and the plane perpendicular to the primary axis P to be less than 20 degrees, and more preferably less than 10 degrees.

The SMA actuator wires 11 to 14 are connected at one end to the movable platform 15 by respective crimping members 17 and at the other end to the support block 16 by crimping members 18. The crimping members 17 and 18 crimp the wire to hold it mechanically, optionally strengthened by the use of adhesive. The crimping members 17 and 18 also provide an electrical connection to the SMA actuator wires 11 to 14. However, any other suitable means for connecting the SMA actuator wires 11 to 14 may alternatively be used.

SMA material has the property that on heating it undergoes a solid-state phase change which causes the SMA material to contract. On heating of one of the SMA actuator wires 11 to 14, the stress therein increases and it contracts. This causes movement of the component 2. Conversely, on cooling of one of the SMA actuator wires 11 to 14 so that the stress therein decreases, it expands under the force from opposing ones of the SMA actuator wires 11 to 14. This allows the component 2 to move in the opposite direction.

As shown in FIG. 1, the SMA actuator wires 11 to 14 have an arrangement around the primary axis P as follows. Each of the SMA actuator wires 11 to 14 is arranged along one side of the component 2. Thus, the SMA actuator wires 11 to 14 are arranged in a loop at different angular positions around the primary axis P. Thus, the four SMA actuator wires 11 to 14 consist of a first pair of SMA actuator wires 11 and 13 arranged on opposite sides of the primary axis P and a second pair of SMA actuator wires 12 and 14 arranged on opposite sides of the primary axis P. The first pair of SMA actuator wires 11 and 13 are capable on selective driving to move the component 2 relative to the support structure 4 in a first direction in said plane, and the second pair of SMA actuator wires 12 and 14 are capable on selective driving to move the component 2 relative to the support structure 4 in a second direction in said plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other in the loop will drive movement of the component 2 in a direction bisecting those two of the SMA actuator wires 11 to 14 (diagonally in FIG. 1, as labelled by the arrows X and Y).

As a result, the SMA actuator wires 11 to 14 are capable of being selectively driven to move the component 2 relative to the support structure 4 to any position in a range of movement in two orthogonal directions perpendicular to the primary axis P. The magnitude of the range of movement depends on the geometry and the range of contraction of the SMA actuator wires 11 to 14 within their normal operating parameters.

The position of the component 2 relative to the support structure 4 perpendicular to the primary axis P is controlled by selectively varying the temperature of the SMA actuator wires 11 to 14. This is achieved by passing through SMA actuator wires 11 to 14 selective drive currents that provides resistive heating. Heating is provided directly by the drive current. Cooling is provided by reducing or ceasing the drive current to allow the component 2 to cool by conduction, convection and radiation to its surroundings.

The drive signals supplied to SMA actuator wires are derived using PWM techniques and the close proximity of the SMA actuator wires to the image sensor can result in the EMI problems referred to previously.

It is an aim of embodiments of the present techniques to address issues with the aforementioned problems and others.

According to a first approach of the present techniques, there is provided a method of synchronising an image sensor with a PWM driver operable to drive an arrangement associated with the image sensor, wherein at least one synchronisation signal produced by the image sensor is used to reset the PWM driver and the at least one synchronisation signal is delayed before being used to reset the PWM driver such that the switching on or off of the at least one synchronisation signal occurs at a defined time in relation to a sensitive period of the image sensor's operation.

In an embodiment, the at least one synchronisation signal is delayed such that its switching on or off occurs outside a sensitive period of the image sensor's operation.

In an embodiment, the amount of delay is varied depending on a duty of the at least one synchronisation signal.

In an embodiment, a duration of the at least one synchronisation signal is unchanged.

In an embodiment, a pulse of the at least one synchronisation signal is shortened or lengthened such that its switching on or off occurs outside a sensitive period of the image sensor's operation.

In an embodiment, a subsequent pulse of the at least one synchronisation signal is lengthened or shortened, respectively, by a time period substantially corresponding to the shortening or lengthening, respectively, of the preceding pulse.

In an embodiment, the at least one synchronisation signal is delayed such that its switching on or off occurs inside a sensitive period of the image sensor's operation.

In an embodiment, the at least one synchronisation signal is one or more of a frame synchronisation signal, VSYNC, and a line synchronisation signal, HSYNC.

In an embodiment, at least one synchronisation signal produced by the image sensor is divided before being used to reset the PWM driver.

According to a second approach of the present techniques, there is provided a non-transitory data carrier carrying control code to implement the method of the first approach.

According to a third approach of the present techniques, there is provided an apparatus arranged to arranged to perform the method of the first approach.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Implementations of the present techniques will now be described, by way of example only, with reference to the accompanying drawings, in which:

FIGS. 4(a) and (b) show further timing diagrams illustrating various embodiments of the present techniques;

In a system such as that shown in FIG. 1, where PWM techniques are employed to create drive signals for the SMA actuator wires, EMI associated with the drive signals can cause interference/noise in the image signal, which can take the form of one or more lines which appear to move across a display screen which displays the image captured by the image sensor.

An aim of embodiments is to minimise the disturbance caused by the line(s) and one means by which this is achieved is to synchronise a Master Clock (MCLK) signal used to clock the image sensor with a PWM drive signal (PWM FREQ).

Figure 2:
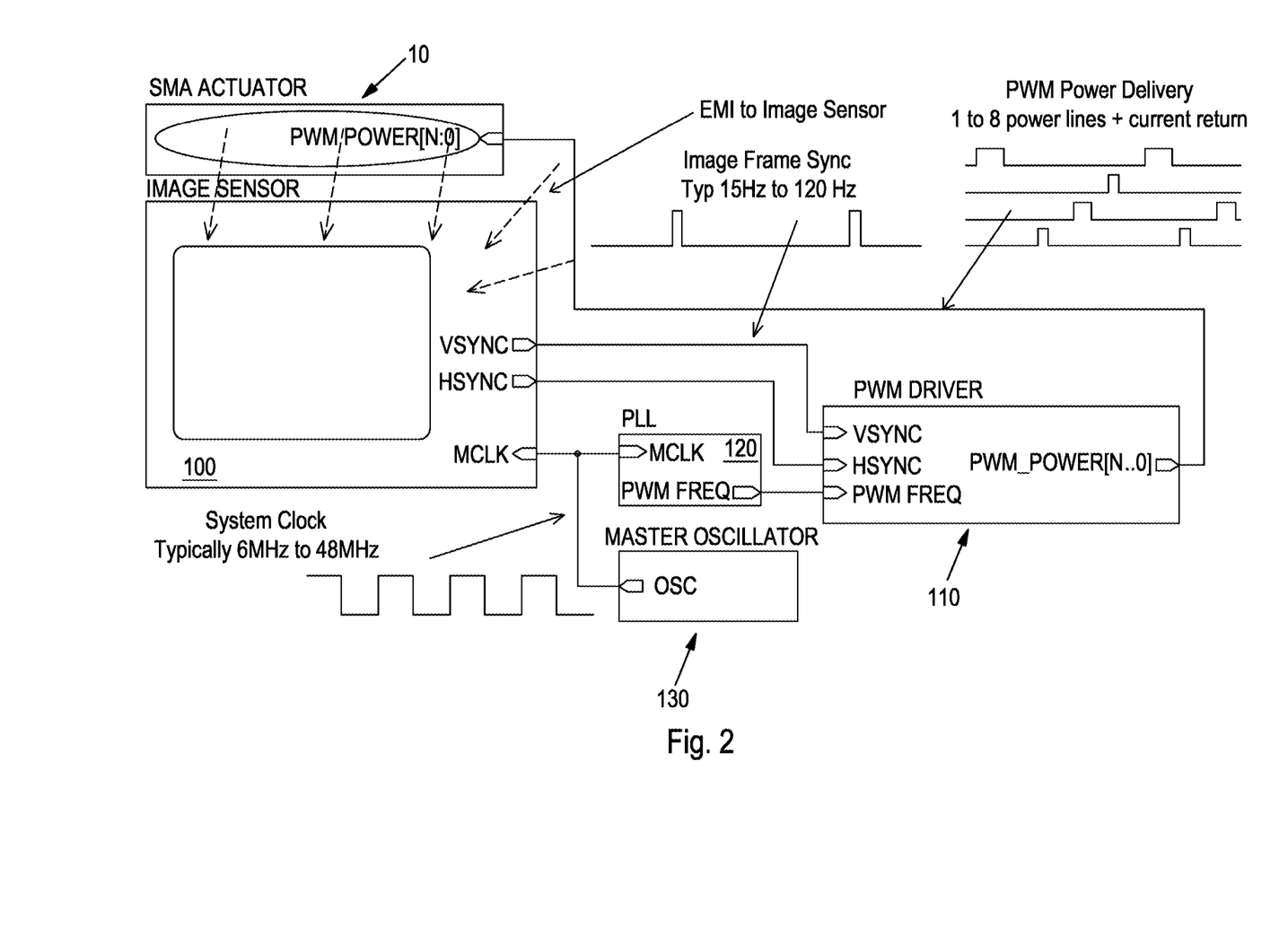
FIG. 2 shows a schematic of a synchronization arrangement according to an embodiment of the present techniques.

This is shown in FIG. 2, where there is shown an image sensor 100. In close physical proximity to the image sensor 100 is the SMA actuator arrangement 10, as shown in FIG. 1. The SMA actuator 10 is driven by a number of individual lines which supply signals/power to each of the individual wires 11 to 14. These signals are derived from PWM driver 110 and are the cause of EMI experienced by the image sensor 100, as indicated by the dotted arrows radiating from the signal lines and actuator 10 towards the image sensor 100.

The PWM driver 110 generates the signals for the actuator according to a scheme controlled by a controller (not shown). The clock signal used to create these signals is PWM FREQ, which is derived from a Phase Locked Loop (PLL) 120. The input to the PLL 120 is MCLK, which is produced by a master oscillator 130. MCLK is also used to clock the image sensor 100.

The PLL 120 is used to maintain a known frequency ratio M/N between the image sensor 100 master clock input MCLK and the PWM drive frequency PWM FREQ. M and N are integers.

In practice, the designer of an apparatus (e.g. a mobile telephone) will not generally have an in-depth knowledge of the operation of the image sensor 100, so it is not generally possible to determine which PWM frequencies are most likely to adversely affect the operation of the image sensor 100. One approach is therefore to sweep all possible PWM frequencies and determine empirically which contribute most noise to the resultant image. It may then be possible to configure the PWM frequencies, taking this knowledge into account, such that the image is degraded as little as possible.

The adverse effects may be dependent on a particular mode of operation and so the operational mode, as well as the PWM frequency may be taken into account when determining the optimum PWM frequency in any particular case.

An even better performance may be obtained by employing an additional synchronisation reference. In FIG. 2, the PWM driver 110 receives a VSYNC input from the image sensor 100 VSYNC output terminal. It should be noted that even if MCLK is not used to synchronise the operations of the image sensor and the PWM driver, which may not be possible in all embodiments, then using VSYNC (or a similar signal) as described in the following yields improved performance.

The image sensor 100 produces a synchronisation pulse VSYNC at the start of each new image frame. VSYNC may be known as a frame synchronisation signal. This VSYNC signal is used to reset the PWM driver 110. This ensures a fixed relationship between the edges of the PWM switching signals supplied to the actuator 10 and the image.

In terms of using the VSYNC signal to reset the PWM driver, there are different approaches possible, as shown in FIGS. 3(a), 3(b) and 3(c).

Figure 3:
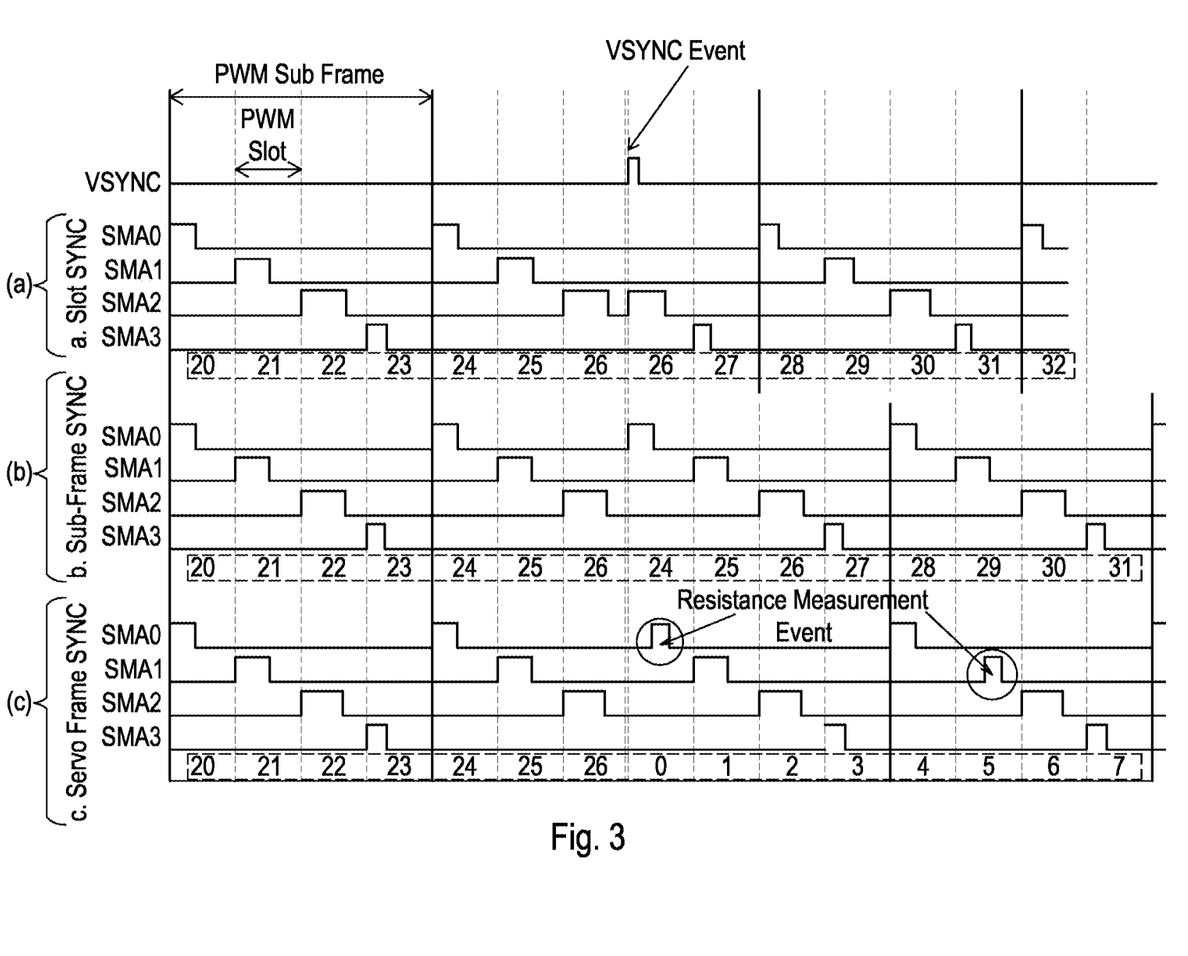
FIGS. 3(a) to (c) show timing diagrams illustrating various embodiments of the present techniques.

The upper pulse shown in FIG. 3 is VSYNC and is relevant to the three embodiments (a) to (c) shown.

The timing pulses shown in each of FIGS. 3(a) to (c) represent signals applied from the PWM driver 110 to each wire SMA0 to SMA3 which form part of SMA actuator 10. The wires 11 to 14 in FIG. 1 correspond to the signals SMA0 to SMA3 in FIG. 3. The exact details of the form of the signals shown on each wire are not important for the purposes of understanding embodiments of the present techniques. It is sufficient to know that a signal is applied to each wire in turn, with the pulse duration being determined according to, inter alia, the movement required of the actuator.

The numbers in the dotted box running along the bottom of each of FIGS. 3(a) to (c) represent a slot count i.e. a sequential count of individual slots corresponding to a signal being applied to any one of the SMA wires.

A PWM sub frame comprises as many PWM slots as there are wires in the actuator. In the present example, there are four wires in the actuator and so there are four slots in the sub-frame. In other examples, there may be other numbers (e.g. eight) of wires and, so, slots.

In FIG. 3(a), an embodiment of the present techniques is illustrated using slot synchronisation. In other words, upon receipt of the rising edge VSYNC signal, the present PWM drive slot (26 in this example) is reset. As can be seen, this results in slot 26 and the corresponding wire (SMA2) being driven again immediately after the VSYNC event. The sequence of slots thereafter continues in sequence. There is no specific relationship between VSYNC and the wire which is driven when it is received and so there is no specific relationship between VSYNC and the wire which is driven immediately after it is received.

FIG. 3(b) illustrates a further embodiment of the present techniques. This embodiment uses sub-frame synchronisation. In other words, upon receipt of the rising edge of the VSYNC signal, the PWM drive is reset to the beginning of the present sub-frame. In this example, VSYNC is received part way through the sub-frame which began at slot 24. Upon receipt of the VSYNC, slot 24 is driven again and the PWM driver 110 continues to drive slots in sequence thereafter.

By use of this embodiment, it is possible to ensure that the same wire (SMA0 in this case, but it could be any wire) is always driven first after a VSYNC event. In practice, each of the SMA actuator wires can have a different impact on the image noise, due to the physical layout of the image sensor and actuator arrangement. By synchronising to SMA0 (or any other of the wires) in a controlled manner ensures that the power delivery PWM sequence is identical after each VSYNC event, meaning that the resultant image noise is static within the image frame. Static image noise is less discernible by the human eye and so less of a problem in practice.

FIG. 3(c) shows a still further embodiment of the present techniques. This embodiment uses so-called servo frame synchronisation. A servo frame is a time period which defines an interval between resistance measurement events in an SMA actuator system. Again, it is not necessary to understand this fully. It is sufficient to know that a servo frame contains a plurality of PWM sub frames.

In this example, VSYNC is received part way through the sub-frame which began at slot 24. Upon receipt of the VSYNC pulse, the sub frame count is reset to 0 i.e. to the start of the servo frame period. At the very start of the servo frame period, in slot 0, a resistance measurement event occurs on SMA0; and in slot 1, a resistance measurement event occurs on SMA1, and so on. These resistance measurement events typically occur once in each servo frame for each wire in the actuator.

By use of this particular embodiment, it is possible to ensure that the same wire is always driven after each VSYNC event and that resistance measurement events occur at known times in each image frame. This is advantageous since image sensors are typically more sensitive to EMI during specific time periods, which may be unknown to a designer using such an image sensor. Therefore, delaying a PWM pulse for resistance measurement runs the risk of moving a switching edge into a more sensitive region. Therefore, if this behaviour is aligned to VSYNC, the resultant image noise will be static within the image frame, and hence less noticeable.

In the foregoing, reference has been made to the rising edge of the VSYNC signal. Of course, the falling edge or a level change could equally be used to indicate the start of a new image frame.

Furthermore, reference to VSYNC as a signal indicating the start of a new image frame uses terminology commonplace in the art of image sensors. However, other reference signals are available and embodiments of the present techniques are not intended to be limited by such terminology or even by virtue of VSYNC indicating the start of a new image frame. Other reference signals may be used, as required, including reference signals indicating the end of the current frame or any other point between the start and the end of the frame. Such a reference signal may be indicative of the timing of an event internal to the image sensor.

An example of another reference signal provided by some image sensors indicates the image capture timing of an Analog to Digital Convertor (ADC) inside the image sensor.

Still another reference signal is known as HSYNC. This signal typically indicates the start of a new line in an image and may be know as a line synchronisation signal. As such, for an image comprising n lines, the image sensor will generate n HSYNC signals for each VSYNC signal. The frequency of HSYNC is therefore n times the frequency of VSYNC.

HSYNC may be used to reset the PWM driver in a similar manner to that which has already been described for VSYNC. This ensures that there is synchronisation between the edges of the PWM signals and the image capture.

In a typical SMA actuator system, the PWM frequencies are in the range 20 kHz to 500 kHz, and HSYNC frequencies are typically in the range 40 kHz to 200 kHz. As such, it is possible to synchronise the PWM generation to the HSYNC signal of the image sensor.

There are various options to achieve this. For instance, if it not possible to operate HSYNC and the PWM signals at the same frequency, or they are asynchronous, then the PWM slot or sub frame may be reset on the basis of a divided-down and delayed version of HSYNC. This divided down and delayed version of HSYNC is known, herein, as SYNC and FIG. 4 shows an illustration of two embodiments of the present techniques which utilise the SYNC signal.

FIG. 2 shows how HSYNC is output from image sensor 100 and input to PWM Driver 110. In practice, any division and delay of HSYNC may be performed internal to PWM Driver 110 or in an external device, such as a further PLL. However, for conceptual purposes, HSYNC, or a modified version of it, is provided from the image sensor and provided to the PWM driver 110.

Figure 4:
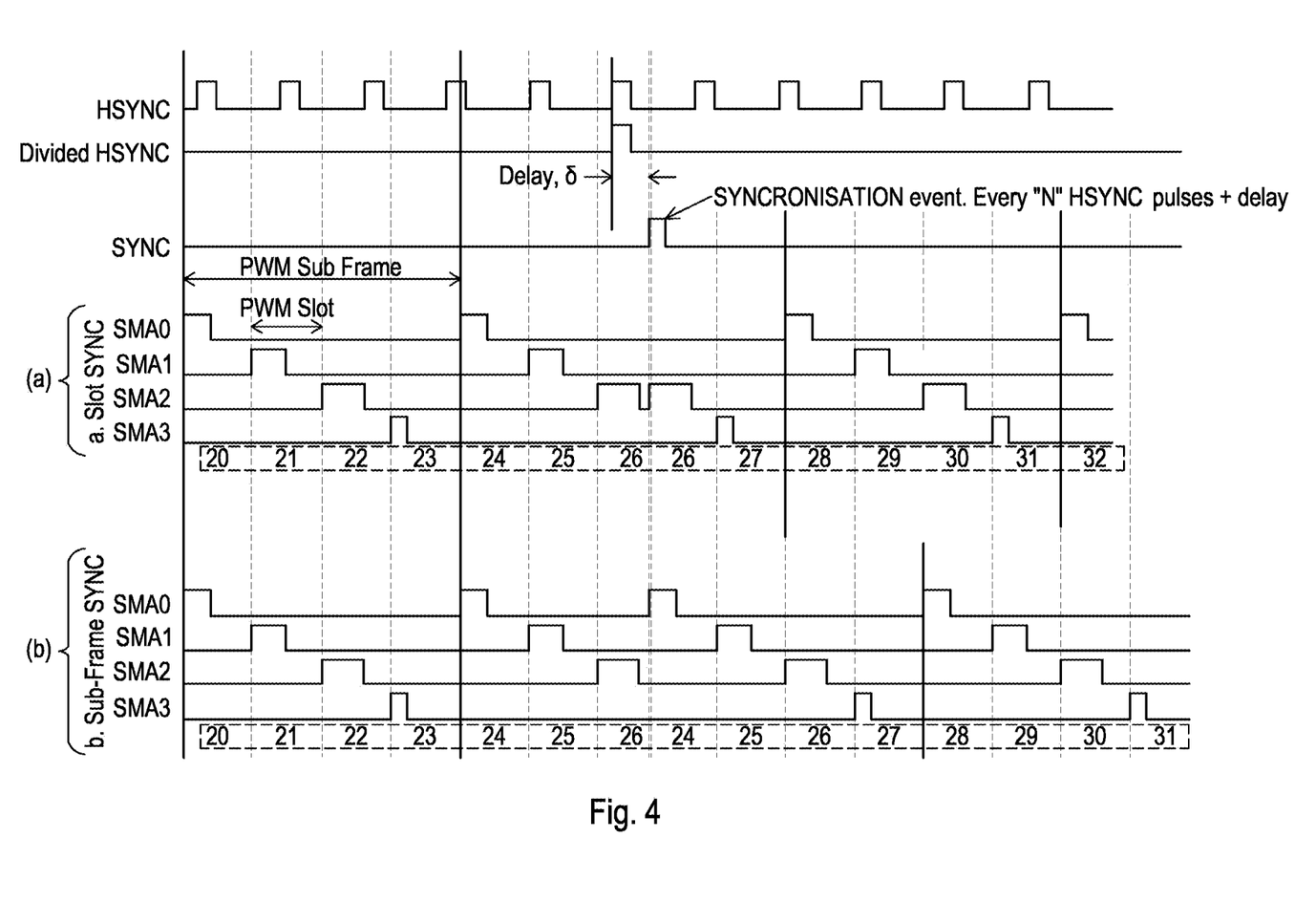

In FIG. 4, the upper three waveforms show, respectively, HSYNC (which has a frequency similar to the PWM frequency), a divided version of HSYNC and a delayed version of that signal. The delay value, δ, is selected such that any particularly sensitive time periods during the operation of the image sensor can be avoided. It may be that δ=0 in some cases or a value which is determined from data concerning the image sensor or by empirical measurements.

In an embodiment, it may also be useful to synchronise to a delayed version of VSYNC, in which case, the VSYNC event shown in FIG. 3 may be delayed and this delayed signal may be used for synchronisation purposes.

FIG. 4(a) is similar to the embodiment illustrated in FIG. 3(a) in that the SYNC pulse here is used to trigger a reset of the PWM driver on a slot basis. In other words, upon receipt of the SYNC signal, the PWM driver resets such that the active slot at the time of SYNC receipt is re-created and subsequent slots are generated sequentially.

FIG. 4(b) is similar to the embodiment illustrated in FIG. 3(b) in that the SYNC pulse here is used to trigger a reset of the PWM diver on a sub frame basis, such that upon receipt of the SYNC signal, the active sub frame at that time is re-created. Here, upon receipt of the SYNC signal, the sub frame beginning at slot 24 is re-created and subsequent slots are generated sequentially.

Reference was made earlier to the internal operations of the ADC and that at certain points the ADC may be more than usually susceptible to EMI. Such points may relate to certain operations of the ADC and FIG. 5 illustrates this.

In general, the user of an image sensor may not have intimate knowledge of the internal operation of the device and, in particular, of the internal timings of various operations which occur. In some cases, a user may have no wish to know about such internal operations. However, as set out herein, it is desirable in certain circumstances to understand the internal operations such that the timing of signals in the vicinity of the image sensor, which may adversely impact its performance, may be controlled in such a way that any adverse effects may be avoided or at least mitigated.

Figure 5:
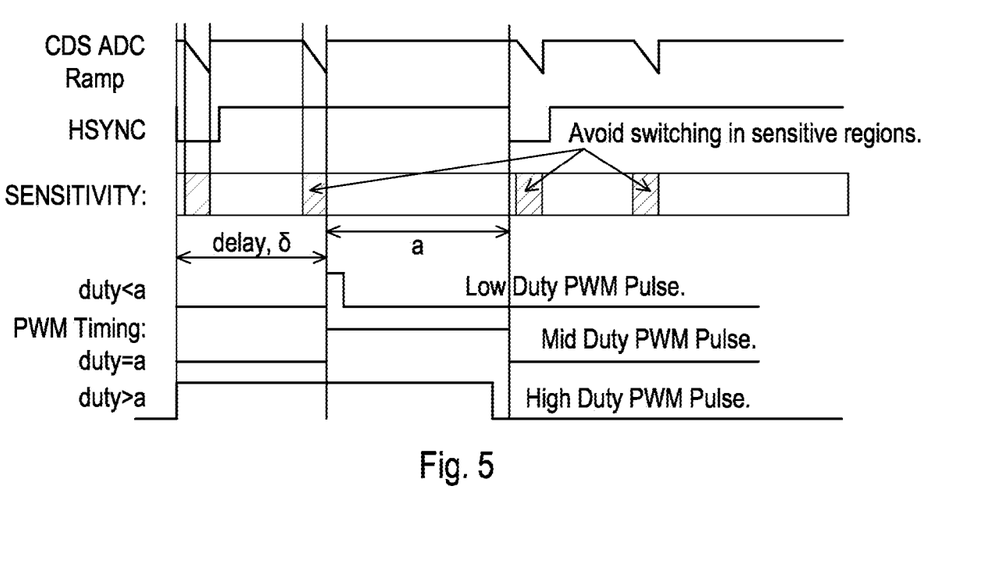
FIG. 5 illustrates typical locations for particularly sensitive regions in a timing diagram associated with the operation of an ADC in an image sensor according to an embodiment of the present techniques.

FIG. 5 illustrates the operation of an ADC internal to the image sensor 100. The type of ADC used in certain image sensors is known as a Correlated Double Sampling (CDS) ADC. This type of device takes two samples. The first is a calibration phase with the particular pixel in a reset state and a second is the measurement phase, with the particular pixel in an exposed state. The sensor is operable to subtract the reset value from the exposed value to calculate the actual intensity of light falling on the pixel.

The upper trace (CDS ADC Ramp) illustrates the two samples and the association with HSYNC, shown in the second trace. HSYNC is associated with the operation of the CDS ADC in a deterministic manner.

The third trace shows the areas of particular sensitivity, which are aligned with the ramp operation of the CDS ADC. In order to avoid adversely affecting the operation of the ADC, it is desirable to avoid PWM switching during these periods.

The lower three traces in FIG. 5 illustrate various ways to arrange the PWM switching depending upon relative duty of the PWM pulse in question. In the first of these is shown a low duty pulse (duty<a, where a is a predefined value). Here, the desired pulse is delayed by a time δ such that the rising edge of the pulse occurs just outside the sensitive region. In this case, the falling edge also falls outside the sensitive region.

In the second of the lower three traces is shown a mid duty pulse, where duty=a. Here, the entire pulse, including both rising and falling edges is arranged to occur between two of the sensitive regions. This avoids any switching (i.e. edges) during the sensitive period.

In the third of the lower three traces, there is shown a high duty pulse (where duty>a). In this case, the pulse is arranged such that it straddles at least one of the sensitive regions. In the example shown, the rising edge of the pulse occurs before a first sensitive region and the pulse continues so that it overlaps two sensitive regions in total and its falling edge occurs before a third sensitive region.

Having a pulse in a high state simultaneously with a sensitive region is of no concern, provided that switching can be avoided in the sensitive regions.

As shown in FIG. 5, regardless of the absolute length (or duty) of a particular pulse, it can always be positioned by means of a suitable delay (if required) so that its rising or falling edge avoids a sensitive region.

Figure 6:
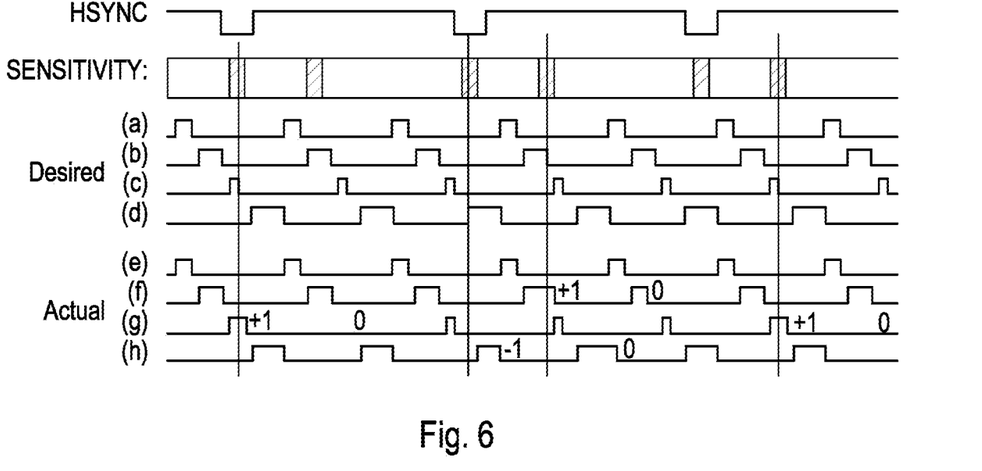
FIG. 6 shows a timing diagram associated with an embodiment of the present techniques which utilises power accounting.

FIG. 6 illustrates a further embodiment which utilises a technique referred to as "power accounting". In embodiments of the present techniques, the length of time that a particular actuator wire is activated is important, but the relative timing of that activation may be varied without adversely affecting the overall system operation. In this way, if a pulse edge is scheduled to occur during a sensitive period, the edge in question is delayed until after the sensitive period. The pulse in question still ends at the originally scheduled time. As a result, the pulse duration is reduced compared to that which was scheduled. This results in a power debit on the particular wire. In subsequent power pulses applied to that wire, the debit can be made good by the application of a pulse which is lengthened to account for the previous debit.

In FIG. 6, trace (a) shows a plurality of pulses which are desired to be applied to an actuator wire. None of the edges of these pulses lie in the sensitive region and so trace (e) shows the actual pulses applied to that wire. These are identical with the desired pulses.

Trace (b) shows a plurality of pulses which are desired to be applied to an actuator wire. As can be seen, the fourth of these pulses has a falling edge which lies in the sensitive region. As such, in the actual pulses shown in trace (f), a power credit, indicated by "+1" is applied, which causes the pulse in question to be lengthened such that the falling edge avoids the sensitive region. In order to account for the power credit which now exists for this wire, the next pulse in the sequence is shortened by a time equivalent to the increase applied to the fourth pulse. This is indicated by the "0" shown by the fifth pulse which indicates that the power credit has been cancelled.

Trace (c) shows where a 1 first pulse in the desired sequence of pulses has a falling edge which lies in the sensitive region. As such, in trace (g), this pulse has been lengthened as described previously. The result of this power credit is again shown by "+1" by the first pulse in trace (g). In order to account for this credit, the second pulse in trace (c) is removed entirely in trace (g) as indicated by the "0" appearing where it would otherwise have been.

Trace (d) shows a sequence of pulses where the third pulse has a rising edge which lies in the sensitive region. As such, the rising edge is delayed, as indicated by the "−1" by the third pulse in trace (h). This signifies a power debit on this wire. In order to account for this, the next pulse is lengthened by the same amount by which the previous pulse was shortened. This is indicated by the "0) by the fourth pulse in trace (h) which can be seen to be longer than the corresponding pulse in trace (d).

These examples show how power credits and debits can be applied and accounted for. In these examples, any debit or credit is accounted for in the next possible pulse, but this may not always be possible, and it may be necessary to account for any debit or credit in a later pulse. Ideally, any such accounting should be carried out as soon as possible after the debit or credit, since the desired heating (and so, length) of the relevant wire may be affected otherwise.

The amount of debit or credit applied to a particular wire may be a freely variable amount or it may be defined in terms of units of time. In either case, a tally is kept per wire of the accumulated debit or credit so that it may be accounted for in a subsequent pulse.

Figure 7:
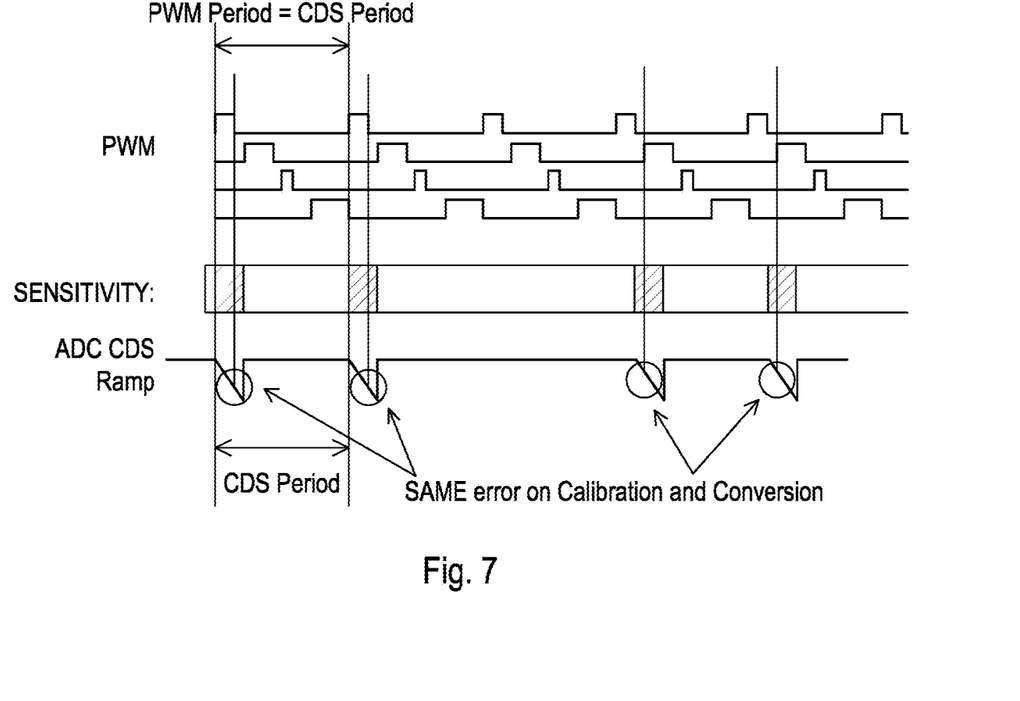
FIG. 7 shows a timing diagram associated with a further embodiment of the present techniques utilising a calibration technique.

FIG. 7 shows a further embodiment of the present techniques which utilises a different approach to switching in the sensitive region. In this embodiment, rather than avoiding switching in the sensitive region, pulses are generated which are forced to switch in the sensitive region. Although, at first glance, this appears contradictory, by making use of the CDS period, which is the period between the calibration phase and the measurement phase of the CDS ADC and ensuring that switching occurs in each of these, the effect of the switching in the sensitive region may be cancelled out. In effect, any error introduced in the calibration phase is also introduced in the measurement phase and since the resultant output is the difference between these two readings, the error introduced by the switching dies not affect the outcome.

It is probably not possible or desirable to have all the wires in a multi-wire actuator system to switch in the sensitive periods, so it may be that only a subset of the wires is caused to switch in this way, while the other wires utilise one of the techniques described previously. Of course, the wire(s) which make up the subset may change over time.

In FIG. 7, this approach is adopted firstly on the first wire, represented by the first trace. Here, the falling edge of the first two pulses in the sequence fall in the sensitive region. For later pulses, the pulses fall outside the sensitive region and so there is no issue with these. However, the timing of pulses on the second wire, indicated by the second trace in FIG. 7, are such that a rising edge occurs in two successive sensitive regions.

In both these cases, any error introduced in the calibration phase is effectively cancelled in the measurement phase and so does not cause an issue.

This is made possible by ensuring that the DCS period and the PWM period, pictured, are configured to be identical.

In the foregoing embodiments, determining the sensitive regions in which switching is to be avoided or minimised, may be performed on the basis of information provided by a manufacturer of the sensor. Such information may be provided in a datasheet for a given sensor. However, in most circumstances, it is expected that the sensitive region(s) are more likely to be determined empirically.

To do this, it is required to operate the sensor with a known input (i.e. an object providing an in input to the sensor). This may take the form of a plain area or a test card, either of which should produce a known output from the sensor. Typically, this would occur in a very (but not totally) dark environment, as this is the environment in which the noise is most likely to be detected. Ideally, the light level should be controlled accordingly.

An actuator or a simulator thereof is then placed in the vicinity of the sensor to mimic a real-life scenario and switching pulses are applied such that their effects can be observed on the output of the sensor. In this way, the interaction of specific pulses can be observed in the output of the sensor. The switching pulses can be referenced to one or more output signals from the sensor, such as HSYNC or VSYNC. Other output signals may be provided and any one or more may be used for this purpose.

Additionally, or alternatively, the operation of the sensor and the determination of the sensitive region(s) may be performed by means of mathematical/physical models.

Once a determination of the sensitive region(s) has been performed, then this data may be used to control the operation of an embodiment of the present techniques as shown in any one or more of FIGS. 4 to 7.

It is possible that the sensor is operable in more than one mode, perhaps providing different sensitivities or pixel counts. The sensitive regions may differ depending on mode and so the determination of the sensitive region(s) may be mode dependent. Any tests or simulations performed, as set out above, should be repeated for different operational modes of the sensor.

Embodiments of the present techniques utilise both VSYNC and HSYNC signals to improve the performance of image sensors. As set out above, embodiments have been described which use VSYNC or HSYNC independently. However, an embodiment where both VSYNC and HSYNC are used yields additional advantages. HSYNC may be used as set out above and in relation to FIG. 4 in particular. VSYNC may then be used to reset the PWM driver such that the servo frame is reset. As mentioned previously, the servo frame is the time period which defines an interval between resistance measurement events in an SMA actuator system. By resynchronising the servo frame using VSYNC and the PWM driver using HSYNC, an increased degree of determinism between the operation of the image sensor and the PWM driver may be achieved.

By use of an embodiment of the present techniques, the adverse effects of EMI from the PWM components upon the image sensor can be mitigated. In particular, the lack of synchronisation of the PWM signals to any significant timing signal of the image sensor can produce multiple lines or stripes which appear to move across a display fed by the image sensor. At the very least, embodiments of the present techniques cause any such lines or stripes to be static and, as such, they are far less intrusive and tend to be overlooked by a user in a way which moving interference patterns cannot.

Further, by selecting one or more of the synchronisation schemes set out herein, it may be possible to deliberately position any lines or stripes caused by EMI at locations which do not significantly interfere with the resultant image. For instance, it may be possible to locate one or more lines or stripes at or near extreme edges of the image where they are far less likely to disrupt the image or annoy the user.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

Furthermore, in some embodiments, the at least one synchronisation signal need not be delayed before being used to reset the PWM driver. Accordingly, further aspects of the present techniques are set out in the following numbered clauses:

1. A method of synchronising an image sensor with a PWM driver operable to drive an arrangement associated with the image sensor, wherein at least one synchronisation signal produced by the image sensor is used to reset the PWM driver.
2. The method of clause 1 wherein the synchronisation signal produced by the image sensor is a signal indicative of an internal event in the image sensor.
3. The method of clause 1 or 2 wherein the at least one synchronisation signal is one or more of a frame synchronisation signal, VSYNC, and a line synchronisation signal, HSYNC.
4. The method of any preceding clause wherein the at least one synchronisation signal is delayed before being used to reset the PWM driver.
5. The method of any of clauses 3 or 4 wherein the synchronisation signal is a frame synchronisation signal and, after the PWM driver has been reset, the PWM driver continues by driving signals for one of: a preceding slot; a preceding sub-frame; or a preceding servo frame.
6. The method of any of clauses 3 or 4 wherein the synchronisation signal is a line synchronisation signal and, after the PWM driver has been reset, the PWM driver continues by driving signals for one of: a preceding slot; or a preceding sub-frame.
7. The method of clause 5 or clause 6 wherein the line synchronisation signal is used to reset the PWM driver on a preceding slot basis or a preceding sub-frame basis and the frame synchronisation signal is used to reset the PWM driver on a servo frame basis.

8. The method of any preceding clause wherein a master clock signal, MCLK, is used to drive the image sensor and the same master clock signal is used to drive the PWM driver.

9. The method of clause 8 wherein the PWM driver generates a PWM drive signal using a Phase Locked Loop operable to maintain a fixed frequency relationship between the master clock signal and the PWM drive signal.

10. The method of clause 9 wherein the fixed frequency relationship between the master clock signal and the PWM drive signal is M/N, where M and N are integers.

11. A non-transitory data carrier carrying control code to implement the methods of any of clauses 1 to 10

12. Apparatus arranged to perform the method of any preceding clause.

13. Apparatus comprising an image sensor and a PWM driver wherein the PWM driver is operable to drive an arrangement associated with the image sensor, wherein at least one synchronisation signal produced by the image sensor is used to reset the PWM driver.

14. Apparatus as specified in clause 13 wherein the arrangement associated with the image sensor is a shape memory alloy, SMA, actuator operable to stabilise an image or focus an image.

The invention claimed is:

1. A method comprising:
synchronising an image sensor with a pulse width modulation (PWM) driver operable to drive an arrangement associated with the image sensor, wherein:
at least one synchronisation signal produced by the image sensor is used to reset the PWM driver; and
the at least one synchronisation signal comprises a frame synchronisation signal VSYNC and, after the PWM driver has been reset, the PWM driver continues by driving signals for one of: a preceding slot; a preceding sub-frame; or a preceding servo frame.

2. A method comprising:
synchronising an image sensor with a pulse width modulation (PWM) driver operable to drive an arrangement associated with the image sensor, wherein:
at least one synchronisation signal produced by the image sensor is used to reset the PWM driver; and
the at least one synchronisation signal is a line synchronisation signal HSYNC and, after the PWM driver has been reset, the PWM driver continues by driving signals for one of: a preceding slot; or a preceding sub-frame.

3. The method of claim 1, wherein:
the at least one synchronisation signal further comprises a line synchronisation signal HSYNC; and
the line synchronisation signal is used to reset the PWM driver on a preceding slot basis or a preceding sub-frame basis and the frame synchronisation signal is used to reset the PWM driver on a servo frame basis.

4. A method comprising:
synchronising an image sensor with a pulse width modulation (PWM) driver operable to drive an arrangement associated with the image sensor, wherein:
at least one synchronisation signal produced by the image sensor is used to reset the PWM driver;
the at least one synchronisation signal comprises one or more of a frame synchronisation signal VSYNC, or a line synchronisation signal HSYNC;
the at least one synchronisation signal is delayed before being used to reset the PWM driver such that a switching on or off of a PWM drive signal generated by the PWM driver occurs at a defined time in relation to a sensitive period of an operation of the image sensor; and
the sensitive period comprises a period where electromagnetic interference associated with the PWM drive signal causes interference or noise in a signal of the image sensor.

5. The method of claim 4, wherein the at least one synchronisation signal is delayed such that the switching on or off of the PWM drive signal occurs outside the sensitive period of the operation of the image sensor.

6. The method of claim 4, wherein an amount of delay is varied depending on a duty of a pulse of the PWM drive signal.

7. The method of claim 5, wherein a pulse of the PWM drive signal is shortened or lengthened such that the switching on or off of the PWM drive signal occurs outside the sensitive period of the operation of the image sensor.

8. The method of claim 7, wherein a subsequent pulse of the PWM drive signal is lengthened or shortened, respectively, by a time period substantially corresponding to a shortening or lengthening, respectively, of a preceding pulse.

9. A method comprising:
synchronising an image sensor with a pulse width modulation (PWM) driver operable to drive an arrangement associated with the image sensor, wherein:
at least one synchronisation signal produced by the image sensor is used to reset the PWM driver; and
the at least one synchronisation signal produced by the image sensor is divided before being used to reset the PWM driver.

10. A method comprising:
synchronising an image sensor with a pulse width modulation (PWM) driver operable to drive an arrangement associated with the image sensor, wherein:
at least one synchronisation signal produced by the image sensor is used to reset the PWM driver;
a master clock signal MCLK, is used to drive the image sensor and the same master clock signal is used to drive the PWM driver; and
the PWM driver generates a PWM drive signal using a Phase Locked Loop operable to maintain a fixed frequency relationship between the master clock signal and the PWM drive signal, wherein the fixed frequency relationship between the master clock signal and the PWM drive signal is M/N, where M and N are integers.

11. The method of claim 4, wherein the PWM driver generates a PWM drive signal, wherein the PWM drive signal is asynchronous with the at least one synchronisation signal.

12. The method of claim 4, wherein the arrangement associated with the image sensor comprises a plurality of shape memory alloy (SMA) actuator wires, and wherein the PWM driver generates a plurality of PWM drive signals for independently driving the plurality of SMA actuator wires.

13. The method of claim 1, wherein the at least one synchronisation signal is delayed before being used to reset the PWM driver.

14. The method of claim 1, wherein the arrangement associated with the image sensor comprises a plurality of shape memory alloy (SMA) actuator wires, and wherein the PWM driver generates a plurality of PWM drive signals for independently driving the plurality of SMA actuator wires.

15. The method of claim 2, wherein the at least one synchronisation signal is delayed before being used to reset the PWM driver.

16. The method of claim 2, wherein the arrangement associated with the image sensor comprises a plurality of shape memory alloy (SMA) actuator wires, and wherein the PWM driver generates a plurality of PWM drive signals for independently driving the plurality of SMA actuator wires.

17. The method of claim 9, wherein the arrangement associated with the image sensor comprises a plurality of shape memory alloy (SMA) actuator wires, and wherein the PWM driver generates a plurality of PWM drive signals for independently driving the plurality of SMA actuator wires.

18. The method of claim 9, wherein the at least one synchronisation signal produced by the image sensor is a signal indicative of an internal event in the image sensor.

19. The method of claim 9, wherein the at least one synchronisation signal comprises one or more of a frame synchronisation signal VSYNC, and a line synchronisation signal HSYNC.

20. The method of claim 10, wherein the arrangement associated with the image sensor comprises a plurality of shape memory alloy (SMA) actuator wires, and wherein the PWM driver generates a plurality of PWM drive signals for independently driving the plurality of SMA actuator wires.

* * * * *